US010970911B2

(12) United States Patent
Schied et al.

(10) Patent No.: US 10,970,911 B2
(45) Date of Patent: Apr. 6, 2021

(54) GRAPHICS PROCESSING CHIP WITH MACHINE-LEARNING BASED SHADER

(71) Applicant: Facebook Technologies, LLC, Menlo Park, CA (US)

(72) Inventors: Christoph Herman Schied, Redmond, WA (US); Anton S. Kaplanyan, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/281,703

(22) Filed: Feb. 21, 2019

(65) Prior Publication Data

US 2020/0273231 A1 Aug. 27, 2020

(51) Int. Cl.
*G06T 15/00* (2011.01)
*G06N 3/04* (2006.01)
*G06T 15/50* (2011.01)
*G06T 15/80* (2011.01)

(52) U.S. Cl.
CPC ......... *G06T 15/005* (2013.01); *G06N 3/0454* (2013.01); *G06T 15/506* (2013.01); *G06T 15/80* (2013.01)

(58) Field of Classification Search
CPC ..... G06T 15/005; G06T 15/506; G06T 15/80; G06N 3/0454; G06N 3/063; G06N 3/0445; G06N 3/084
See application file for complete search history.

(56) References Cited

U.S. PATENT DOCUMENTS

| 7,633,506 | B1* | 12/2009 | Leather | G06T 15/005 |
| | | | | 345/505 |
| 2005/0190194 | A1* | 9/2005 | Kraemer | G06T 15/04 |
| | | | | 345/582 |
| 2011/0193978 | A1* | 8/2011 | Wu | G06T 7/207 |
| | | | | 348/208.6 |
| 2011/0199391 | A1* | 8/2011 | Olsson | G06T 1/60 |
| | | | | 345/649 |

(Continued)

OTHER PUBLICATIONS

Nalbach, et al., Deep Shading: Convolutional Neural Networks for Screen-Space Shading, arXiv:1603.06078v2 [cs.GR], 12 pages, Aug. 3, 2016.

(Continued)

*Primary Examiner* — Maurice L. McDowell, Jr.
*Assistant Examiner* — Donna J. Ricks
(74) *Attorney, Agent, or Firm* — Baker Botts L.L.P.

(57) ABSTRACT

Embodiments disclosed herein relate to a graphics processing chip for rendering computer graphics. The graphics processing chip may include a controller configured to manage operations of the graphics processing chip in accordance with a graphics-rendering pipeline. The operations may include geometry-processing operations, rasterization operations, and shading operations. The chip may further include programmable memory components configured to store a machine-learning model configured to perform at least a portion of the shading operations. The chip may also include a plurality of processing units configured to be selectively used to perform the shading operations in accordance with the machine-learning model. The chip may also include at least one output memory configured to store image data generated using the shading operations.

20 Claims, 9 Drawing Sheets

(56) References Cited

U.S. PATENT DOCUMENTS

| | | | |
|---|---|---|---|
| 2011/0316855 A1* | 12/2011 | Mejdrich | G06T 15/06 345/420 |
| 2012/0330620 A1* | 12/2012 | Sullivan | G05B 19/4097 703/1 |
| 2013/0044128 A1* | 2/2013 | Liu | G06T 19/006 345/633 |
| 2013/0335434 A1* | 12/2013 | Wang | G06N 20/00 345/581 |
| 2015/0193967 A1 | 7/2015 | Wang | |
| 2018/0109526 A1* | 4/2018 | Fung | H04L 63/168 |
| 2018/0349527 A1* | 12/2018 | Li | B25J 9/161 |
| 2018/0357514 A1* | 12/2018 | Zisimopoulos | G06N 3/0472 |
| 2019/0183451 A1* | 6/2019 | Yu | G06F 16/258 |
| 2019/0228723 A1* | 7/2019 | Mei | G06F 12/0207 |
| 2020/0008701 A1* | 1/2020 | Ye | A61B 5/055 |
| 2020/0090371 A1* | 3/2020 | Hu | H04N 7/183 |
| 2020/0160594 A1* | 5/2020 | Hoover | G06T 17/00 |
| 2020/0167654 A1* | 5/2020 | Guo | G06F 16/2246 |

OTHER PUBLICATIONS

Kyrkou, Stream Processors and GPUs: Architectures for High Performance Computing the Department of Electrical and Computer Engineering, Student Member, IEEE University of Cyprus, Nicosia, Cyprus, 2014.

International Search Report and Written Opinion for International Application No. PCT/US2020/018130, dated Jun. 25, 2020.

Akenine-Moller, et al., Real-Time Rendering, Chapter 2: The Graphics Rendering Pipeline, XP55704180, 20 pages, 2008.

Esser, et al., Convolutional Networks for Fast, Energy-Efficient Neuromorphic Computing, arxiv.org, XP055346052, 8 pages, May 24, 2016.

Davies, et al., Feature Article: Neuromorphic Computing, Loihi: A Neuromorphic Manycore Processor with On-Chip Learning, IEEE Computer Society, XP55704102, 18 pages, Feb. 2018.

Nguyen-Phuoc, et al., RenderNet: A deep convolutional network for differentiable rendering from 3D shapes, arxiv.org, 18 pages, Apr. 1, 2019.

* cited by examiner

GRAPHICS PROCESSING CHIP WITH MACHINE-LEARNING BASED SHADER

TECHNICAL FIELD

This disclosure generally relates to graphics processing chips and machine learning.

BACKGROUND

"Computer graphics" refers to computer-generated image data (including still images and videos) created using graphics hardware and software. Computer graphics, especially ones with high-resolution and/or high-frame-rate, are computationally costly to generate. For example, to generate a single image with 4096×2160 resolution means that the colors of nearly 9 million pixels need to be determined. To generate a video with 60 frames-per-second (fps), the number of pixels needed every second quickly approaches 530 million. The amount of computational power needed to render such a vast amount of color data within stringent timeframes often becomes the bottleneck for computer graphics applications. For example, to meet the timing demands of real-time rendering, computer graphics applications often need to sacrifice resolution and/or the complexity of the scene, resulting in less than ideal results.

Specialized hardware has been developed to address the high computational demands of computer graphics. Graphics processing units ("GPU") are specialized computing hardware optimized for graphics processing. Compared to general-purpose central processing units ("CPU"), GPUs have many more execution units and transistors that are designed to perform highly parallel operations. In addition, GPUs include specifically designed hardware components for performing particular operations that are common in graphics-rendering pipelines. For example, a GPU may have hardware components for performing, in general, geometry processing, rasterization, and shading. Certain stages in the pipeline are designed to use physically-based rendering techniques, which are computationally expensive and do not scale well. As such, the computational expense could become prohibitive if the desired image is of a complex scene and/or the desired image resolution is high. Thus, although current GPU designs have provided tremendous processing power for rendering graphics, their performance continues to be a bottleneck for graphics applications.

SUMMARY OF PARTICULAR EMBODIMENTS

Figure 1:
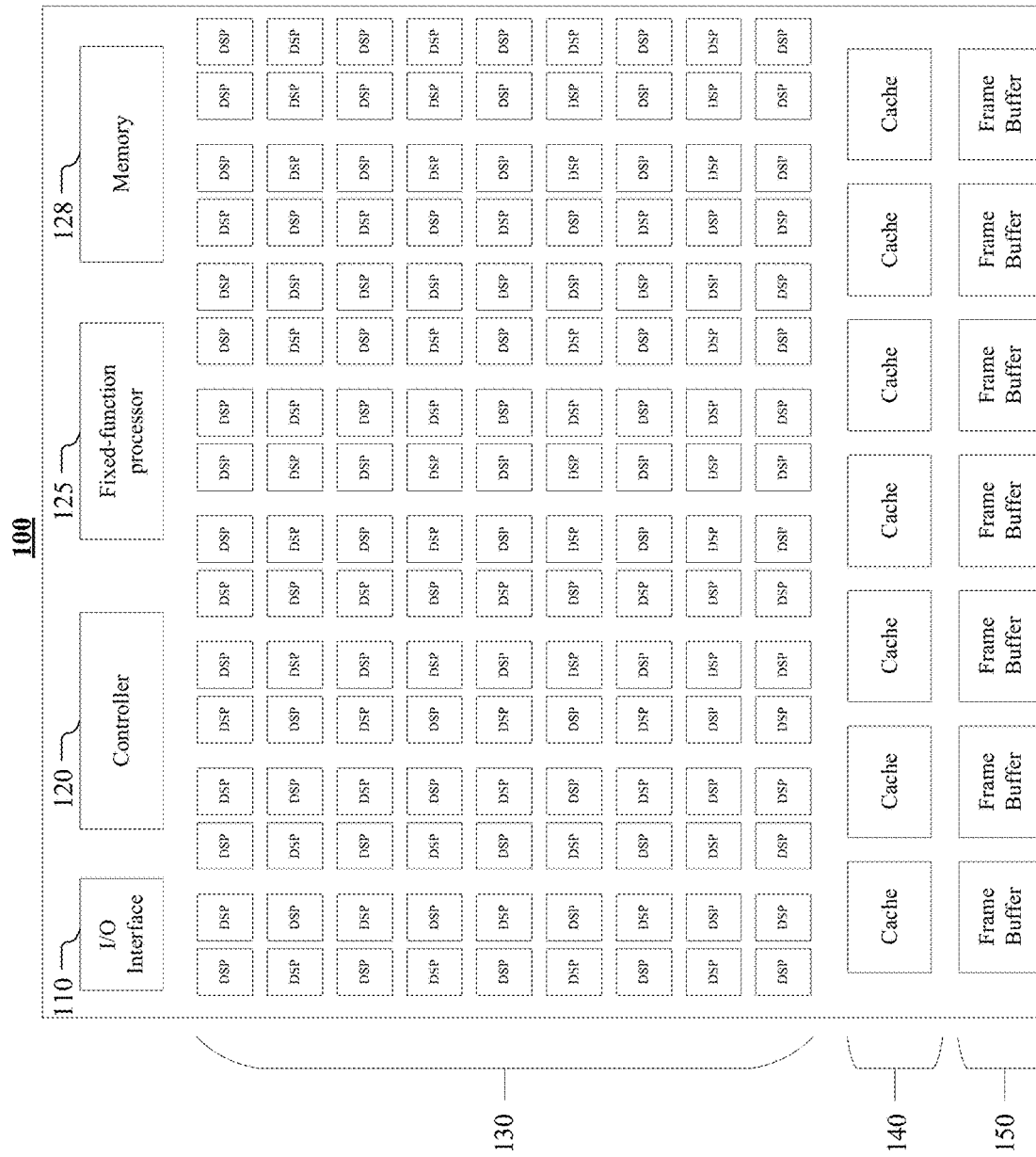
FIG. 1 illustrates an example of an ML graphics processing chip in accordance with particular embodiments.

Particular embodiments described herein relate to a graphics processing chip designed to support one or more phases in a graphics-rendering pipeline to be machine-learning based. For example, the graphics processing chip may include an array of programmable digital signal processors (DSPs) configured to performing shading operations in accordance with a machine-learning model trained to perform such tasks. For example, the machine-learning model may be trained to take as input attributes associated with a fragment (such as positions, normal, reflectance, lighting, etc.) and output color for the fragment. The operations performed by such a machine-learning-based approach is much faster than those performed by traditional GPUs with streaming processors or fixed-function modules designed for performing computationally expensive physically-based shading. In addition, the graphics processing chips described herein allow graphics rendering to be much more scalable than traditional GPUs, which in turn allow computer-graphics applications with stringent time constraints (e.g., real-time rendering) to design much more complex and/or detailed scenes.

Embodiments of the invention may include or be implemented in conjunction with any type of computing system, including but not limited to mobile devices, desktops, servers, graphics system, and artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a graphics processing chip, a method, a storage medium, a system, and a computer program product, wherein any feature mentioned in one claim category, e.g., graphics processing chip, can be claimed in another claim category, e.g., system, storage medium, computer program product, and method, as well.

The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment, a graphics processing chip may comprise:
- a controller configured to manage operations of the graphics processing chip in accordance with a graphics-rendering pipeline, the operations comprising geometry-processing operations, rasterization operations, and shading operations;
- at least one programmable memory component configured to store (or storing) a machine-learning model configured to perform at least a portion of the shading operations;
- a plurality of processing units configured to be selectively used to perform the shading operations in accordance with the machine-learning model; and
- at least one output memory configured to store image data generated using the shading operations.

The machine-learning model may be stored in the programmable memory component and may be configured to generate an output based on view data, lighting data, color data, and material property data; and
   the image data stored in the output memory may be generated using the output of the machine-learning model.

The output of the machine-learning model may comprise intensity data; and
   the image data may be generated based on the color data and the intensity data.

Wherein the machine-learning model may be configured to generate the output based on a second intensity data.

The at least one programmable memory component may be configured to store a second machine-learning model configured to generate a second output based on one or more of: the view data, the lighting data, the color data, and the material property data; and
   the second intensity data may be generated using the second output, the view data, and
   the lighting data.

The second intensity data may be generated in accordance with an illumination model.

The second output of the second machine-learning model may comprise specular data used by the illumination model to generate the second intensity data.

The machine-learning model and the second machine-learning model may be trained end-to-end using a plurality of training samples.

The machine-learning model may be trained using a plurality of training samples;
   each of the plurality of training samples may be associated with material property data associated with a virtual surface and target color data associated with a fragment.

The target color data may be associated with a target image with post-processing effects.

The machine-learning model may comprise a neural network.

The plurality of processing units may be digital signal processors.

In an embodiment, the graphics processing chip may comprise:
   an interface for communicating with an off-chip circuit through which rendering instructions are received.

The view data, the lighting data, the color data, and the material property data may be associated with one or more fragments.

The one or more fragments may be generated using the geometry-processing operations and the rasterization operations.

The color data and the material property data may be associated with one or more virtual surfaces that have been determined to be visible through the one or more fragments.

The plurality of processing units may be configured to be selectively used to perform the geometry-processing operations or the rasterization operations.

In an embodiment, the graphics processing chip may comprise:
   one or more fixed-function processors configured to perform the geometry-processing operations or the rasterization operations.

The controller may be configured to cause the geometry-processing operations to be performed prior to the rasterization operations.

The controller may be configured to cause the shading operations to be performed after the geometry-processing operations and the rasterization operations.

In an embodiment, one or more computer-readable non-transitory storage media embody software that is operable when executed to perform in a system according to the invention or any of the above mentioned embodiments.

In an embodiment, a computer-implemented method uses a system according to the invention or any of the above mentioned embodiments.

In an embodiment, a computer program product, preferably comprising a computer-readable non-transitory storage media, is used in a system according to the invention or any of the above mentioned embodiments.

DESCRIPTION OF EXAMPLE EMBODIMENTS

GPUs are specialized processors for rendering 3D graphics. Traditional GPUs are designed to perform a series of operations in accordance with a graphics-rendering pipeline to synthesize an image from a description of a scene. Conceptually, the graphics-rendering pipeline takes as input a 3D model, which is usually defined by a wire mesh of triangles or other types of geometry. An example of a graphics-rendering pipeline may include, at a high-level, geometry-processing, rasterization, shading, and post-processing. During the geometry-processing phase, 3D model definitions (e.g., defined using 3D coordinates of vertices and edges) of computer-graphics objects (e.g., a teapot, table, etc.) may be transformed from a model coordinate system into a common coordinate system. The output of the 3D model transformation may be a stream of vertices. The lighting properties of each vertex may then be computed based on the lighting conditions and the camera position. Then, the vertices may be assembled into colored triangles.

The output of this phase may be a stream of triangles. Triangles that are not visible may be discarded (or clipped) based on z-buffer testing.

After the geometry-processing phase of the graphics-rendering pipeline, the resulting triangles may be rasterized. Rasterization is the process of transforming each of the triangles into a raster format represented by one or more fragments (e.g., visually the fragments may be squares that collectively approximate the triangle). The fragments may represent candidate pixel values (each pixel could correspond to multiple fragments). The output of the rasterization phase is a stream of fragments.

The next phase in the graphics-rendering pipeline may be shading, which refers to the process of determining the appropriate color of each fragment that is visible. Traditional GPUs are designed to perform physically-based shading. For example, to compute the appropriate color value for each fragment, the shading process may be configured to use a shading algorithm (e.g., Gouraud or Phong shading) and/or illumination model that accounts for the physical behaviors and properties of light. Conceptually, for example, a physically-based shader may account for how a ray may reflect, refract, and/or diffract into subrays by computing how the ray would behave, according to physics, with the virtual 3D surface based on its position and orientation, material properties, and/or texture. This process is computationally expensive and does not scale well with scene complexity (e.g., more computation is needed to account for more light sources and/or objects in the scene). As a result, the existing shading process of GPUs imposes a practical bottleneck for graphics applications.

After pixel colors have been determined by the shading phase, any desired post-processing may be performed to create the desired effects, including, but not limited to, blending, blurring, anti-aliasing, etc. As an example, when blurring is desired, the rendering system may take the bit-accurate image result from the shading process and then average nearby pixels to generate a blurred image. Thus, to generate a blurred image, the system would (1) first generate a bit-accurate image and (2) blur the result. Not directly generating the desired output (in this case, a blurred image) may introduce inefficiency.

Traditional GPUs are equipped with specially designed hardware that is optimized for performing the various operations of the graphics-rendering pipeline. For example, certain GPUs may have fixed-function processing units that are each dedicated to accelerating geometry processing, rasterization, or shading. Additionally or alternatively, GPUs may have an array of stream processors, designed to provide fast and efficient parallel execution of floating-point computations, that can be selectively tasked with performing different stages of the pipeline. For example, a GPU's physical layout may be predominantly occupied by stream processors, which can be selectively tasked with performing operations such as vertex processing, geometry processing, and pixel/fragment processing. The speed and efficiency, however, come at the expense of flexibility. For example, while stream processors are suitable for applications requiring high levels of parallelism and data locality, they are not as efficient for performing logical or branching-intensive operations.

Even though the stream processors and fixed-function hardware are highly optimized to perform shading operations, such operations are nevertheless computationally expensive (e.g., physically-based simulations) and limits real-time performance. To address the various limitations of traditional GPUs and the need for faster, more power-efficient ways to render graphics, particular embodiments described herein introduce a new machine-learning (ML) graphics processing chip with machine-learning acceleration hardware configured to support a graphics-rendering pipeline with stages that are machine-learning based. In particular embodiments, the machine-learning pipeline implemented by the graphics processing chip may use machine-learning techniques to perform shading, rather than physically-based shading. It is observed that on a GPU, the different stages of a graphics-rendering pipeline typically have different power consumption characteristics. As mentioned above, the shading processing stage is typically the bottleneck. For instance, to render a typical image, roughly 10% of the power and time used may be for geometry processing, 50% may be for shading, and 40% may be for local shading and post-processing. If no post-processing operation is performed, the total percentage of power and time spent for shading would further dwarf the power and time used for geometry processing (e.g., shading be responsible for 80% of power consumption). Thus, by using machine-learning techniques to perform shading operations rather than relying on physically-based computations, the ML graphics processing chip can render images with significantly less power and time. An additional benefit of using an ML-based shader is that it affords the designer the flexibility to sacrifice rendering quality to meet stringent runtime demands. For example, for applications that require high frame rate but not bit-accurate results, the ML graphics processing chip may use a smaller neural network to output faster results. Even though the rendering quality may not be bit-accurate, it may be still sufficiently good for that particular application as the sub-optimal quality may not be perceptible (e.g., the scene may be fast-moving, or the pixels may be in the peripheral vision of the user anyway). This option is not available on traditional GPUs since shaders are configured to only output bit-accurate results.

FIG. 1 illustrates an example of an ML graphics processing chip 100 in accordance with particular embodiments. The ML graphics processing chip 100 may have an input/output interface 110 for communicating with an off-chip circuit (e.g., a central processing unit or memory modules), through which rendering instructions and data are received. There may also be a controller 120 for performing scheduling logic, assigning computational resources, thread management, etc. The ML graphics processing chip 100 may also have fixed-function processors 125 that for performing highly-parallel tasks such as rasterization, data assembly, z-culling, etc. The chip 100 may also have one or more memory banks 128 for storing programmable instructions, including machine-learning models that are trained to perform shading operations. In addition, the ML graphics processing chip 100 may have cache 140 (e.g., L1 or L2 cache) and frame buffers 150 to which the output image is written for display.

In particular embodiments, the ML graphics processing chip 100 may have a large array of digital signal processors (DSP) 130 that are configured to accelerate ML operations. Unlike stream processors used by GPUs, DSPs are more flexible processors that can accommodate the varying designs of machine-learning models and data configurations. For example, the DSPs 130 may be configured to accelerate vector and/or matrix operations, which are common operations for deep neural networks and convolutional layers. DSPs 130 are also more suitable for handling memory intensive operations, which may be required by certain machine-learning models (e.g., recurrent neural networks). Thus, the DSPs 130 improve the ML graphics processing chip's 100 efficiency and ability to perform the needed machine-learning operations on-chip and help eliminate or minimize the need for splitting operational duties with the CPU, which can introduce latency and inefficiency.

In particular embodiments, ML graphics processing chip 100 may be configured to perform the full shading stage of the graphics-rendering pipeline using a machine-learning model. A machine-learning based approach has several advantages over the physically-based approach to shading. As described above, the traditional physically-based shading pipeline is computationally expensive as it needs to perform complex computations to mimic physical properties of light. As a result, physically-based shading scales poorly with the complexity of a scene (e.g., a scene that has many objects and/or light sources may make the scene overly complex to render within the allotted time). In contrast, a machine-learning based shading pipeline uses machine learning to learn how certain inputs (e.g., lighting, material properties, ray incidents, etc.) correlate to color without needing to compute light traversal and other computationally expensive calculations that would otherwise be needed in the physically-based pipeline. In addition, unlike traditional pipelines where post-processing effects are applied after a full frame is rendered (e.g., after a clean, sharp image is rendered, it is altered in a subsequent post-processing step to correct for aliasing artifacts), the machine-learning based shading process may directly render a frame with the desired post-processing effect (e.g., anti-aliasing, depth-of-field, blurring, etc.). The machine-learning based shading process also affords further optimization by allowing the color of multiple pixels to be determined in one pass. In particular embodiments, each pass through the machine-learning model may output the color value for a single pixel. However, in other embodiments, the machine-learning model may be configured to process the color values of multiple pixels in one pass of the machine-learning model (e.g., the output of one pass may be the color values for a 2-by-2, 3-by-3, or n-by-m block of pixels, which may also be referred to as a tile). In addition, the machine-learning based shading process is much more scalable to scene complexity, which in turn allows designers of graphics applications to be less hindered by the practicalities of graphics rendering. These examples of the computational efficiency afforded by the embodiments described herein translate to reduced power consumption (which is especially important for mobile devices with limited power source and weight and size limitations) and rendering time.

Figure 2:
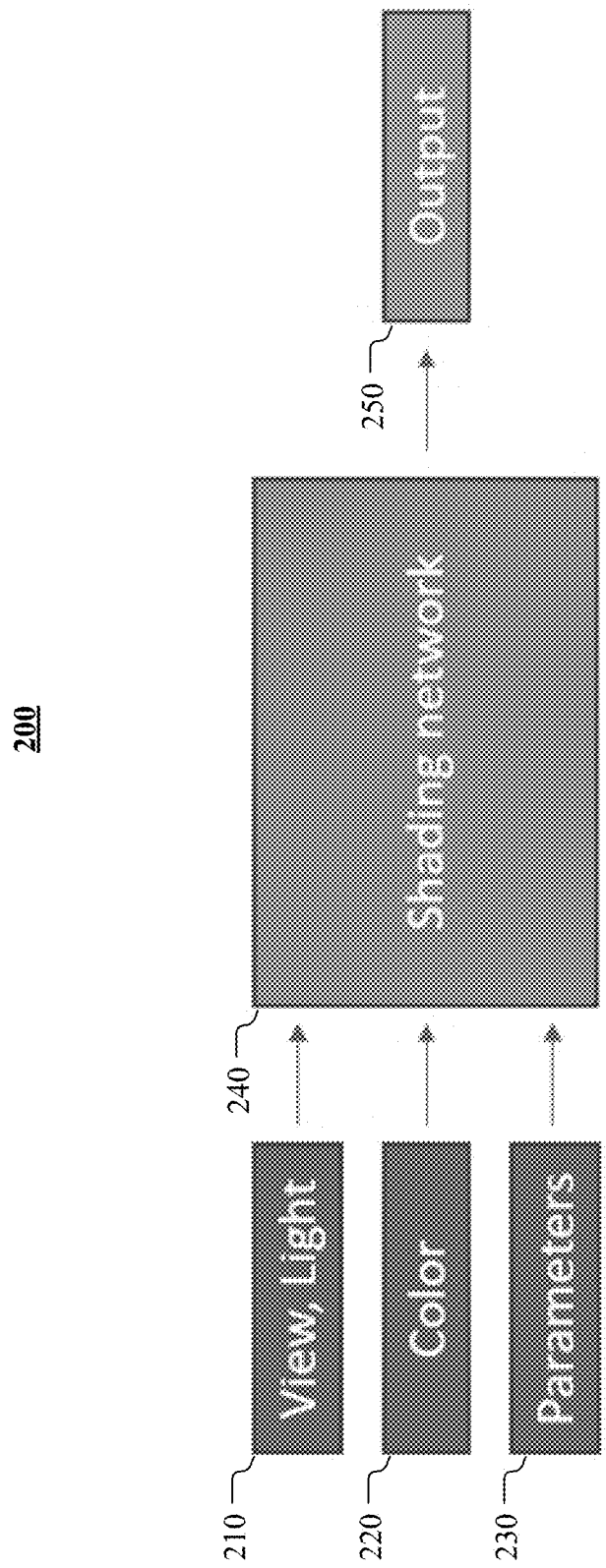
FIG. 2 illustrates an example machine-learning shading architecture for the ML graphics processing chip, in accordance with particular embodiments.

FIG. 2 illustrates an example machine-learning shading architecture 200 for the ML graphics processing chip, in accordance with particular embodiments. The machine-learning architecture 200 may include a neural network 240 (or other suitable machine-learning models) configured to perform the task of shading. The shading neural network 240 may be configured to process data associated with a fragment(s) and generate a corresponding output 250 (e.g., the color value for the fragment) for that fragment(s). Each fragment may be associated with a surface in virtual space (e.g., the surface of a virtual apple) that is visible through the fragment, and parameters associated with that surface may be used as the input for the shading neural network 240. For example, the network 240 may take as input environmental data 210, such as the viewing direction of the camera/viewer relative to the surface. Environmental data 210 may also include surrounding light sources relative to the surface (e.g., the relative location of the light source to the surface may be represented using a vector). In particular embodiments, the color 220 of the surface may also be input into the shading neural network 240. For example, if the surface is of an apple, the known color of that stop sign may be a shade of red (e.g., expressed in red, green, and blue values). In addition to surface color 220, other parameters 230 associated with the surface, such as those representing surface orientation (e.g., represented by the surface normal) and material properties, may also be input into the network 240. Examples of material properties may include measures for metallic properties, roughness, specular reflectance, clearcoat, clearcoat roughness, refractive index, and any other suitable measures of material property. The material properties may be physically-based (e.g., defined so that the material properties correspond to the actual physical material properties of an object, such as wood or glass) or defined in any desired manner (e.g., the material properties of a virtual object could have any desired material properties unconstrained by reality or physics).

In particular embodiments, the shading neural network 240 may learn to directly output 250 the color, expressed in RGB (red, green, and blue) and alpha (transparency), for the fragment. The training data from which the network 240 learns may include a sufficiently large number of training samples that each include the parameters of fragment(s) (e.g., view direction, light sources, material properties, etc.) and the corresponding known target color value (i.e., the ground truth) for that fragment(s). For example, if photo-realistic results are desired, then the ground-truth would be the color values of a photo-realistic image. Although in this example the ground-truth color is of a photo-realistic image, the ground-truth color is not so limited and could be any desired color. For example, the ground-truth could be a computer-generated or rendered image, an image to which a particular effect has been applied (e.g., a blurring or smoothing effect), an image that has undergone certain image corrections (e.g., white-balancing, color correction, anti-aliasing, etc.), or any other desired target image. Each time the network 240 outputs an inferred color result for a fragment(s), it may compare the result to the known color of that fragment(s) using a loss function and use back-propagation to update the neural network 240 accordingly. After a sufficiently large number of such training iterations (e.g., after the loss function is below a threshold error rate or after a threshold number of training iterations), training may terminate.

In particular embodiments, the shading neural network 240 may be trained to infer from the input data the appropriate color for a given fragment(s) and output 250 the result. Once the shading neural network 240 is trained, it may, in operation, be executed by the one or more programmable DSPs 130 of the ML graphics processing chip 100. For example, after the ML graphics processing chip 100 performs geometry processing and rasterization, the fragments generated therefrom may be input into the shading neural network 240 to determine their color. In particular embodiments, a single fragment or a tile of fragments may be processed together using the shading neural network 240. For example, the shading neural network 240 may take as input the parameters associated with a fragment(s) (e.g., view direction, light sources, surface color, material data, etc.) and infer an appropriate output that may be used to generate the color for that fragment(s).

Figure 3:
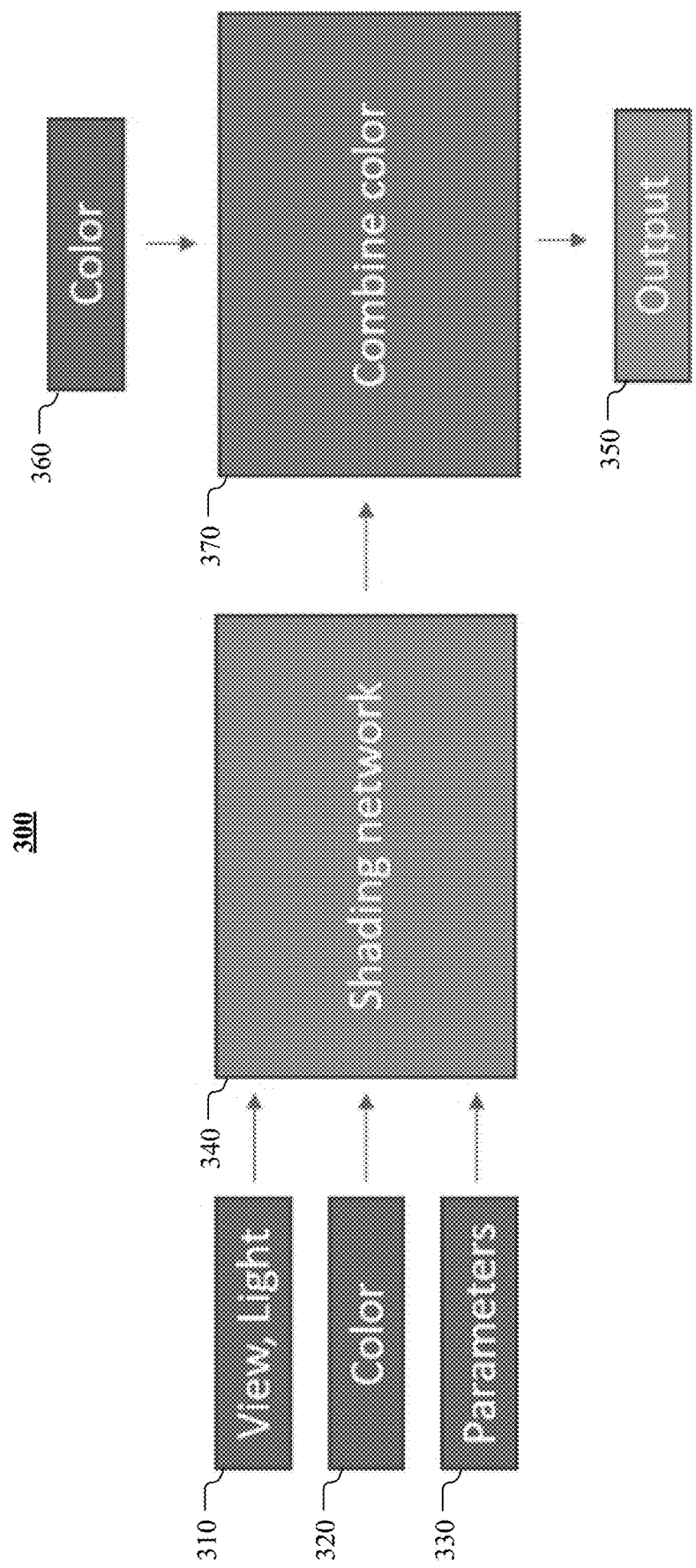
FIG. 3 illustrates another embodiment of a machine-learning shading architecture 300 for the ML graphics processing chip, in accordance with particular embodiments.

Although the shading neural network 240 may learn to directly output 250 the color value expressed in RGB (red, green, and blue) and alpha (transparency), for certain machine-learning models it may be difficult to learn multiplicative operations that would be needed to output the fragment color directly. Thus, in other embodiments, the shading neural network may instead learn to determine color weights and intensity that may be used to compute the fragment color. FIG. 3 illustrates another embodiment of a machine-learning shading architecture 300 for the ML graphics processing chip, in accordance with particular embodiments. The machine-learning shading architecture 300 may include a shading neural network 340 that is configured to take as input a variety of parameters associated with a fragment(s), such as the view and lighting directions 310, surface color 320, and other material properties 330, similar to what is shown in FIG. 2. However, instead of directly outputting the final RGB data for the fragment, the shading network 340 may be configured to output color weights and intensities (e.g., weight and intensity values may be generated for each of the RGB color channels). The color weights and intensities output by the network 340 may then be combined, using a color computation module 370, with the surface color 360 associated with the fragment (e.g., by applying or multiplying each color channel of the surface color 360 with the corresponding inferred weight and/or intensity for that color channel). The color computation module 370 may then output 350 the RGB color for the fragment.

In particular embodiments, the shading neural network 340 may be trained to infer from the input data the appropriate color weights and intensities for a given fragment(s). The training data from which the network 340 learns may include a sufficiently large number of training samples (e.g., thousands, millions, billions, etc.) that each include the parameters of fragment(s) (e.g., view direction, light sources, material properties, etc.) and the corresponding known target color value (i.e., the ground truth) for that fragment(s). As previously described, the ground-truth or target color could be a photo-realistic image, a rendered image, an image with post-processing effects, etc. Each time the network 340 outputs the inferred color weights and/or intensities, the color computation module 370 may combine those results with the surface color 360 to generate the fragment color 350. The network 340 may compare the generated fragment color to the known color of the fragment (s) using a loss function and use back-propagation to update the neural network 340 accordingly. After a sufficiently large number of such training iterations (e.g., after the loss function is below a threshold error rate or after a threshold number of training iterations), training may terminate. Once trained, the ML graphics processing chip may use the trained shading neural network 340 to generate color weights/intensities and use the output to compute the appropriate color for the fragment(s) according to the architecture 300.

Figure 4:
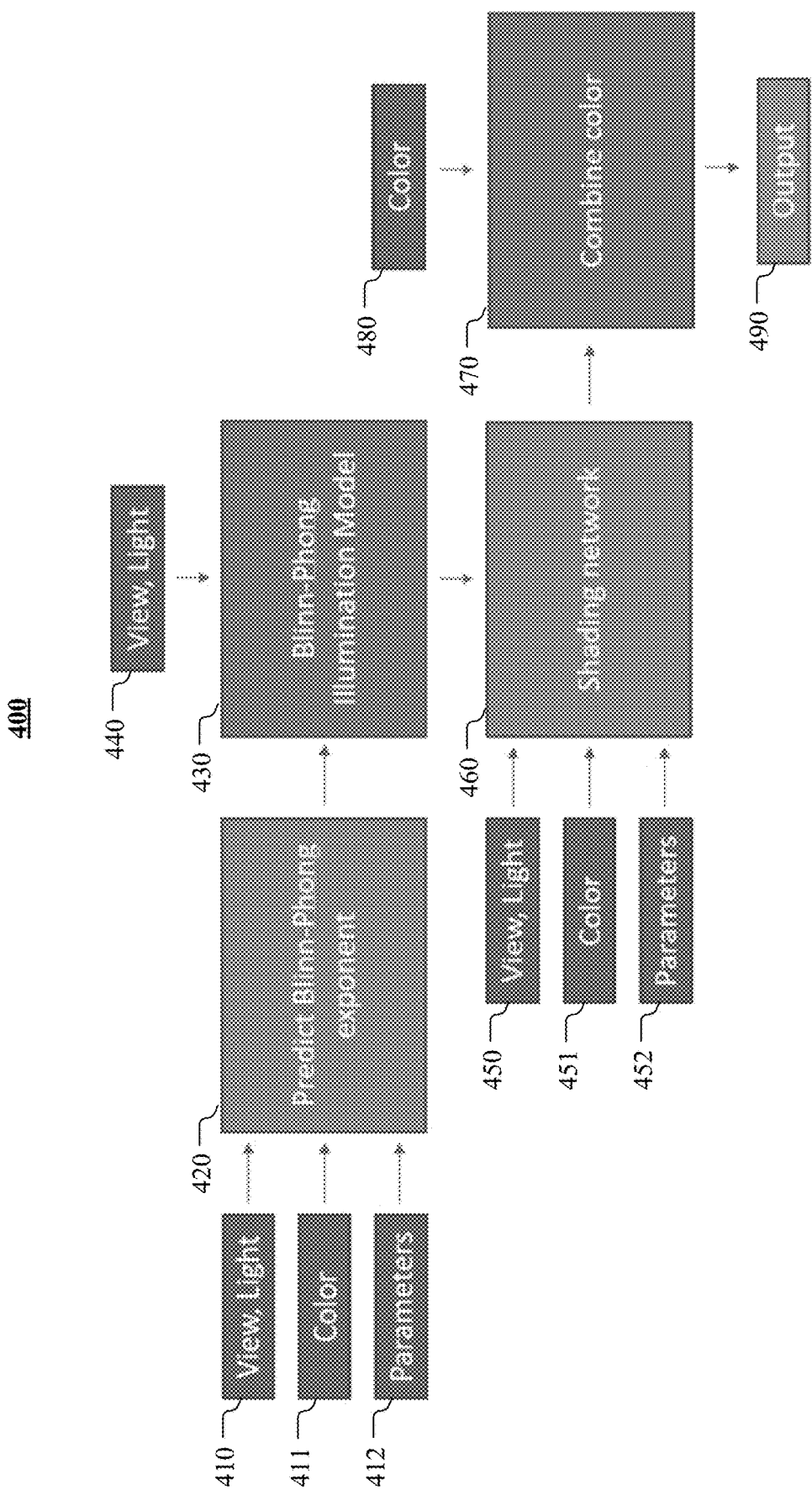
FIG. 4 illustrates another example machine-learning shading architecture for the ML graphics processing chip, in accordance with particular embodiments.

FIG. 4 illustrates another example machine-learning shading architecture 400 for the ML graphics processing chip, in accordance with particular embodiments. In this embodiment, the architecture 400 is designed to use machine learning to further account for the specular term that represents the shininess of the visible surface. In particular embodiments, the architecture 400 may include a specular-exponent network 420 that is configured to take as input a fragment's data, such as environmental data 410 (e.g., view direction and light source directions), surface color 411, and other parameters 412 (e.g., material properties of the surface), and predict a specular representation s. The specular representation may then be used in an illumination model 430, such as the Blinn-Phong illumination model, that describes the way a local surface reflects ambient, diffused, and specular light. For example, the model may be defined as:

$$f = \max(N \cdot H, 0)^s$$

where:
f represents light intensity (could be per color channel);
N represents the normal vector of the surface;
H represents the half-angle vector; and
s represents the specular exponent.
The half-angle vector H is defined as:

$$H = \frac{v + L}{|v + L|}$$

where:
v represents the direction from the point of interest on the surface pointing toward the viewer/camera; and
L represents the direction from the point of interest on the surface pointing toward each light source.

Based on the input data 410-412 associated with the fragment of interest, the specular-exponent network 420 may predict the specular exponent value s. Then, the shading architecture 400 may use an illumination model 430 to compute the light intensity (e.g., which could be for each color channel) for the fragment based on the predicted specular exponent s and the view direction and light direction vectors 440.

The shading architecture 400 may use the output of the illumination model 430 as part of the input parameters to the shading neural network 460 to predict the color weights and intensities. Since the shading neural network 460 is provided with the illumination model's 430 output, which represents a Bidirectional Reflectance Distribution Function (BRDF), the shading neural network 460 would only need to learn deviations from the BRDF to produce significantly smoother results. The shading neural network 460, similar to the network 340 shown in FIG. 3, may take fragment data as input, such as environmental data 450 (e.g., view direction and light source directions), surface color 451, and other parameters 452 (e.g., material properties of the surface). These parameter data 450-452 may be the same as or different from the parameter data 410-412 that was input into the specular-exponent network 420. Based on the fragment parameter data 450-452 and the output from the illumination model 430, the shading neural network 460 may predict the color weights and/or intensities for the fragment of interest. Similar to what was described with reference to FIG. 3, a color computation module 470 may combine the predicted color weights/intensities with the surface color 480 to generate the fragment color 490.

In particular embodiments, specular-exponent network 420 and the shading neural network 460 may be trained in an end-to-end fashion. For example, the training data from which the networks 420 and 460 learn may include a sufficiently large number of training samples (e.g., thousands, millions, billions, etc.) that each include the parameters of fragment(s) (e.g., view direction, light sources, material properties, etc.) and the corresponding known color value (i.e., the ground truth) for that fragment(s). As previously described, the ground-truth or target color could be a photo-realistic image, a rendered image, an image with post-processing effects, etc. Using the fragment parameters, the networks 420 and 460 may output an inferred fragment color 490 using the process described above. The networks 420 and 460 may compare the generated fragment color to the known color of the fragment using a loss function and use back-propagation to update the networks 420 and 460 accordingly. After a sufficiently large number of such training iterations (e.g., after the loss function is below a threshold error rate or after a threshold number of training iterations), training may terminate. Once trained, the ML graphics processing chip may use the trained specular-exponent network 420 and shading neural network 460 to generate color weights/intensities and use the output to compute the appropriate color for the fragment(s) according to the architecture 400.

Figures 5A, 5B:
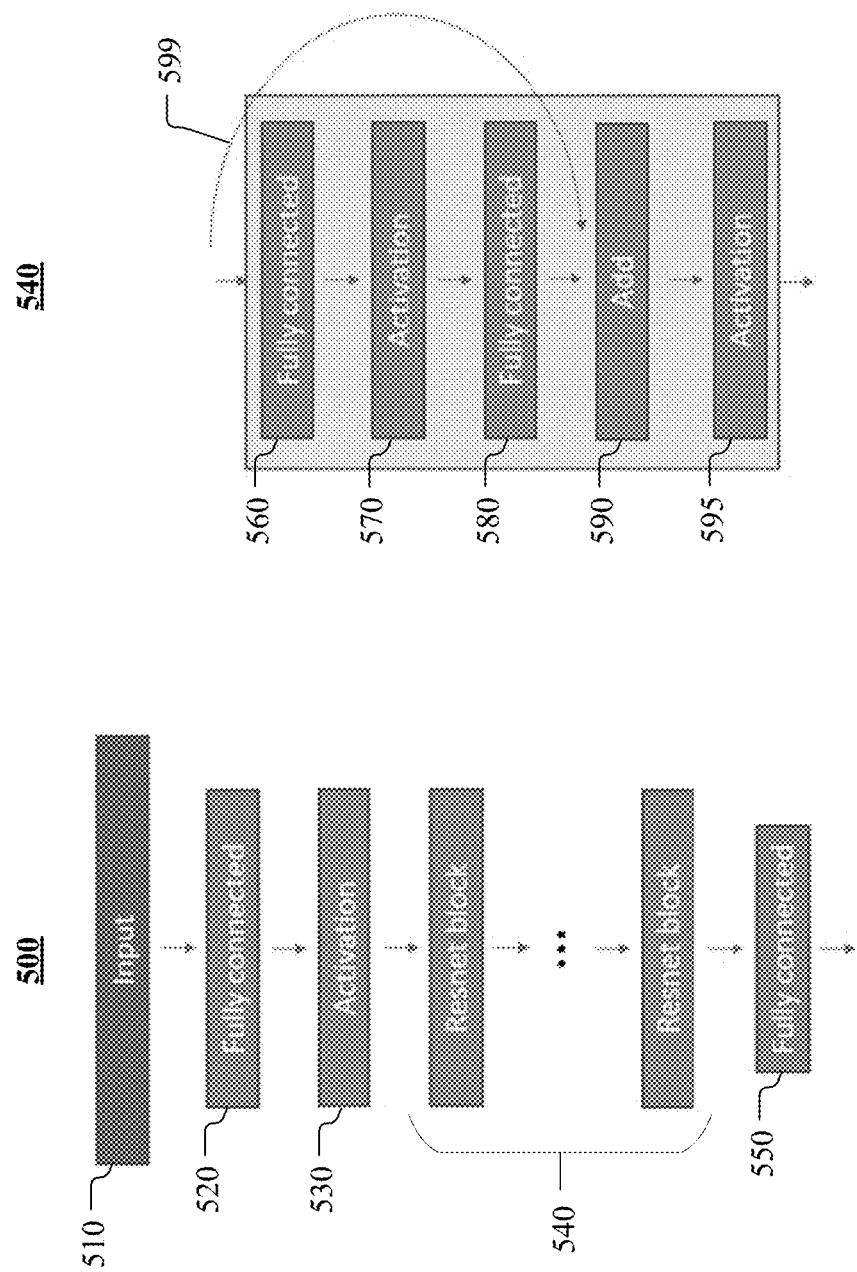
FIGS. 5A and 5B illustrate examples of neural-network architectures that may be used in particular embodiments.

In particular embodiments, the neural networks described herein (e.g., shading neural network and/or specular-exponent network) may have several layers. FIGS. 5A and 5B illustrate examples of neural-network architectures that may be used in particular embodiments. FIG. 5A illustrates an example neural-network architecture 500. The neural network having this architecture 500 may receive an input 510, such as the aforementioned fragment data (e.g., view direction, light direction, material properties, etc.). The network may process the input data using a fully-connected layer 520. The output of the fully-connected layer 520 may be processed by an activation block 530. The output of the activation block 530 may then be processed by one or more Resnet blocks 540. The output of the last Resnet block 540 may then be processed by a fully-connector layer 550, which outputs the inferred or predicted result (e.g., the color weights/intensities or specular exponent). FIG. 5B illustrates an embodiment of each Resnet block 540. Each Resnet block 540 may process its input using a fully-connected layer 560, followed by an activation layer 570, and followed by another fully-connected layer 580. The output of the last fully-connected layer 580 may then be added 590 with the input of the Resnet block 540 through a skip connection 599. The output of the add block 590 may then be processed by another activation layer 595, which in turn may output the result to the next Resnet block 540 or the fully connected layer 550 shown in FIG. 5A. The Resnet blocks allow for deeply-stacked smaller layers, which helps with redundancy inside of the network. While these figures show a particular network architecture, this disclosure contemplates any other suitable network architecture as well.

Figure 6A:
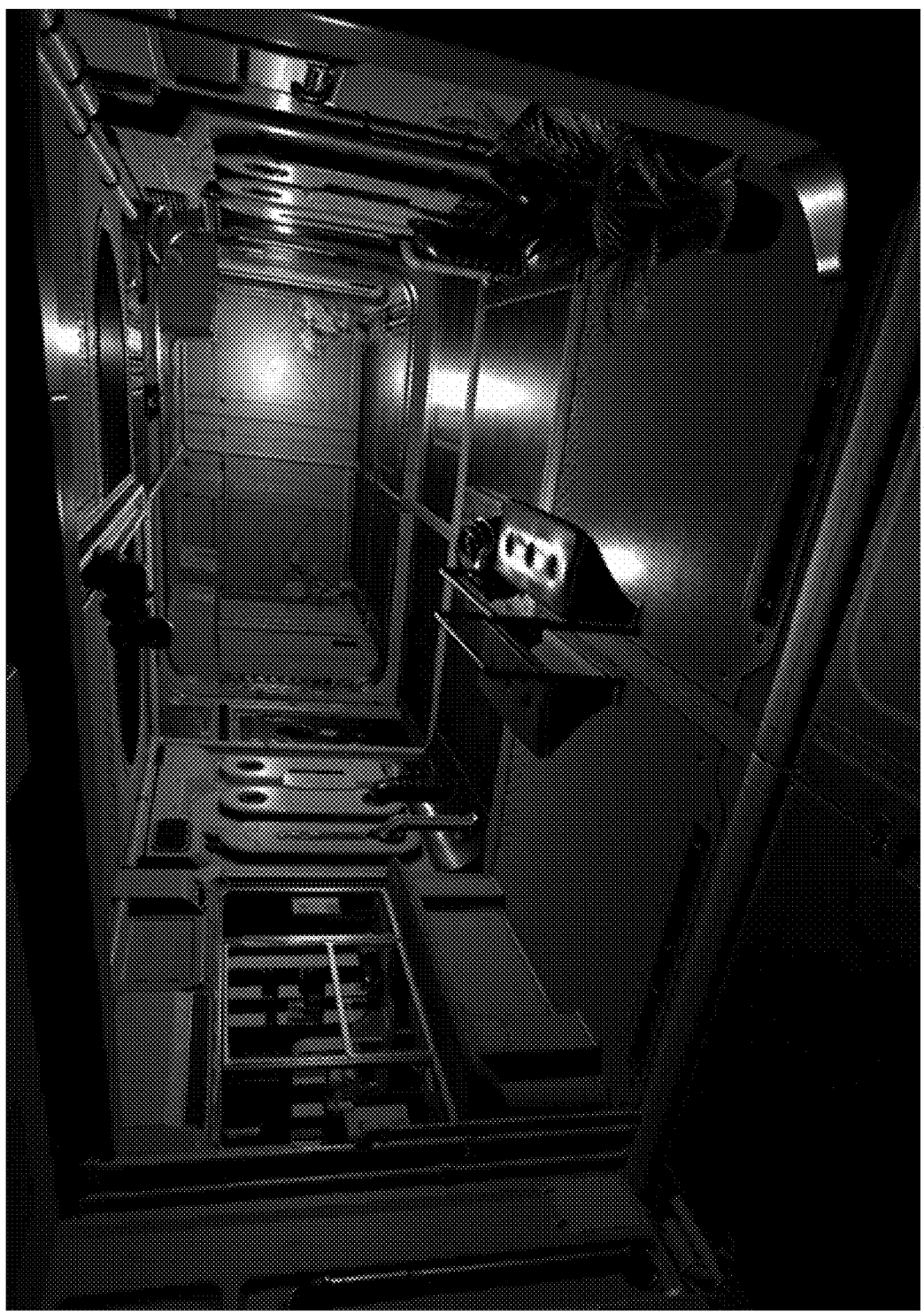
FIGS. 6A and 6B provide a comparison between a reference image and a predicted image generated using embodiments described herein.
Figure 6B:
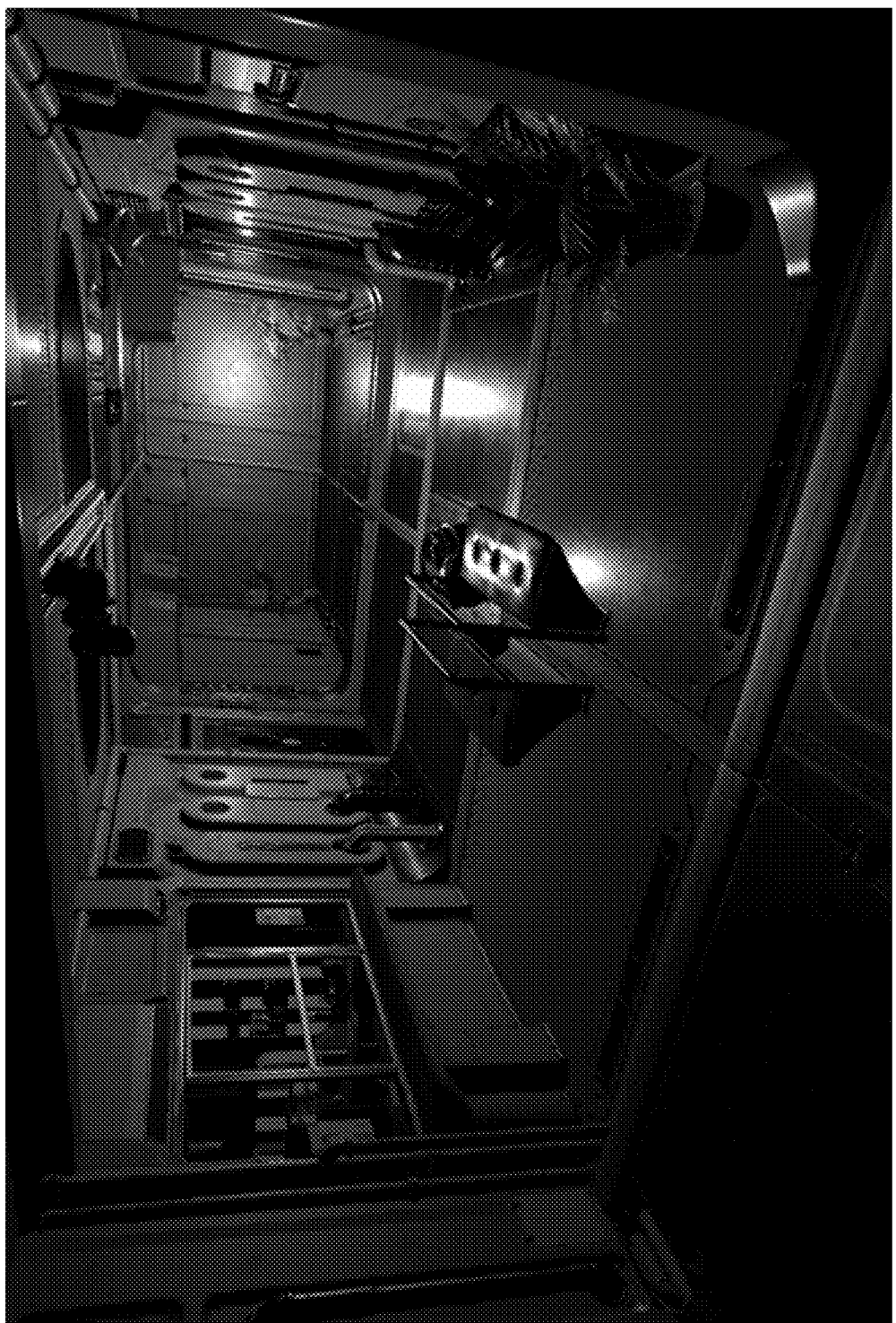

FIGS. 6A and 6B provide a comparison between a reference image and a predicted image generated using embodiments described herein. In particular, FIG. 6A illustrates an example of a reference image 600 of a scene generated using a traditional GPU pipeline. FIG. 6B, on the other hand, illustrates a predicted image 601 of the same scene rendered using embodiments described herein. As can be seen from these examples, the predicted image 601 using the machine-learning based graphics pipeline is perceptively similar to the photo-realistic image 600 generated using a traditional GPU's graphics pipeline. These examples demonstrate that the various benefits of using the ML graphics processing chip as described elsewhere herein do not come at the cost of a significant reduction in image quality.

Figure 7:
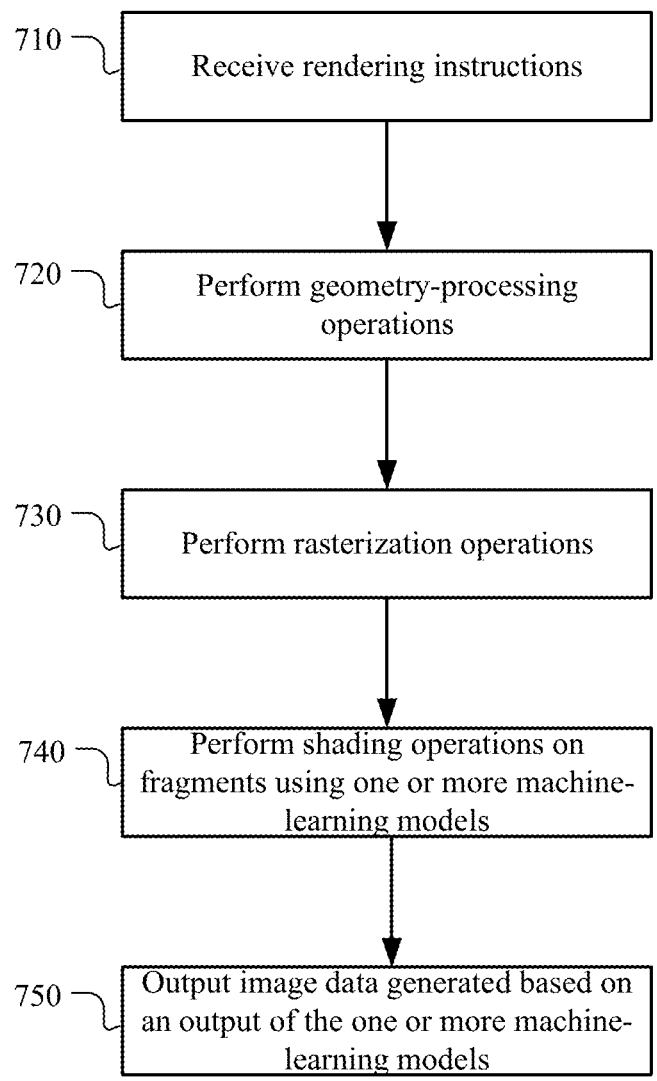
FIG. 7 illustrates an example processing flow of the graphics processing chip, in accordance with particular embodiments.

FIG. 7 illustrates an example processing flow of the graphics processing chip, in accordance with particular embodiments. At step 710, the graphics processing chip may receive rendering instructions. The instructions may be received through an interface coupled to one or more off-chip circuits, such as a central processing unit, a memory module, etc. The rendering instructions may, for example, include a 3D model of a scene to be rendered, light sources, and a viewing direction of a viewer/camera. In response, the graphics processing chip, through a controller, may schedule operations to be performed according to a graphics-rendering pipeline implemented in hardware and/or firmware.

At step 720, the graphics processing chip may perform geometry-processing operations, including, for example, transforming the 3D model into another coordinate system, assembling the triangles, perform visibility tests, etc. In particular embodiments, the geometry-processing operations may be performed by fixed-function processors, assigned to digital signal processors, or a combination of the two. In particular embodiments, the geometry-processing operations may output a series of triangles used to represent the visible part of the scene. Each of the triangle (or its vertices) may be associated with surface properties, such as color and other material properties.

At step 730, the graphics processing chip may perform rasterization operations, including, for example, determining the fragments through which each triangle is visible. In particular embodiments, the geometry-processing operations may be performed by fixed-function processors, assigned to digital signal processors, or a combination of the two.

At step 740, the graphics processing chip may perform shading operations, including, for example, processing one or more fragments (e.g., a single fragment or a tile of fragments) using one or more machine-learning models to determine the appropriate color for those fragments. In particular embodiments, the controller of the chip may schedule the shading operations to be performed using the on-chip digital signal processors. The operations may be carried out in accordance with the trained machine-learning models, as previously described. For example, to determine the color of a fragment, the DSPs may process data associated with that fragment (e.g., viewing data, lighting data, color data of the visible surface, and/or material property data associated with the visible surface) in accordance with the trained neural network. The output of the model may be intensity data, which may be used together with the surface color data to compute the image data for the fragment. In particular embodiments, the neural network may further take as input an intensity data generated using a second neural network (e.g., the specular-exponent network) and an illumination model. For example, the specular-exponent network may be configured to process one or more of the viewing data, lighting data, color data of the visible surface, and/or material property data associated with the visible surface to generate specular data (e.g., a specular exponent). The specular data may then be used to compute, in accordance with an illumination model, intensity data. This intensity data may then be input into the shading neural network, along with data associated with the fragment of interest. The shading neural network may then generate an output that may correspond to a final intensity data. The final intensity data may then be applied to the color of the surface to generate the appropriate image data for the fragment.

At step 750, the generated image data may be output by the graphics processing chip. For example, the generated image data may be accumulated in an on-chip cache and/or frame buffers so that they may be read by off-chip circuits. For example, the image data in the frame buffers may be read by a CPU and transmitted to a server for cloud-based distribution or forwarded to a display unit (e.g., monitor, virtual-reality headset, augmented-reality headset, etc.) for display.

Figure 8:
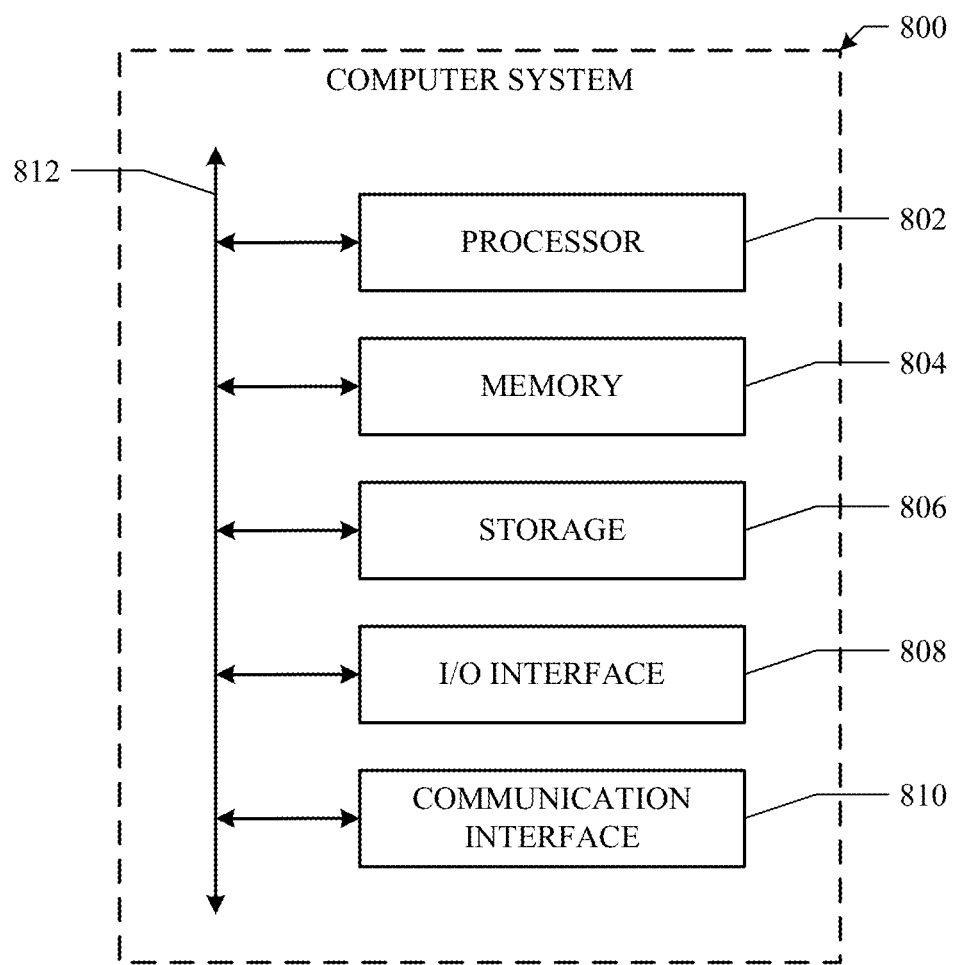
FIG. 8 illustrates an example computer system.

FIG. 8 illustrates an example computer system 800 on which the graphics processing chip may be installed. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides the functionality described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802, which may include the graphics processing chip described herein, includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates a particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), an HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:
1. A graphics processing chip, comprising:
  a controller configured to manage operations of the graphics processing chip in accordance with a graphics- rendering pipeline, the operations comprising geometry-processing operations, rasterization operations, and shading operations;

at least one programmable memory component configured to store a machine-learning model configured to perform at least a portion of the shading operations, wherein the machine-learning model is trained using a plurality of training samples, and wherein each of the plurality of training samples is associated with material property data associated with a virtual surface and target color data associated with a fragment;

a plurality of processing units configured to be selectively used to perform the shading operations in accordance with the machine-learning model; and at least one output memory configured to store image data generated using the shading operations.

2. The graphics processing chip of claim 1,
wherein the target color data is associated with a target image with post-processing effects.

3. The graphics processing chip of claim 1,
wherein the machine-learning model comprises a neural network.

4. The graphics processing chip of claim 1,
wherein the plurality of processing units are digital signal processors.

5. The graphics processing chip of claim 1, further comprising:
an interface for communicating with an off-chip circuit through which rendering instructions are received.

6. The graphics processing chip of claim 1, wherein the plurality of processing units are further configured to be selectively used to perform the geometry-processing operations or the rasterization operations.

7. The graphics processing chip of claim 1, further comprising:
one or more fixed-function processors configured to perform the geometry-processing operations or the rasterization operations.

8. The graphics processing chip of claim 1, wherein the controller is configured to cause the geometry-processing operations to be performed prior to the rasterization operations.

9. The graphics processing chip of claim 8, wherein the controller is configured to cause the shading operations to be performed after the geometry-processing operations and the rasterization operations.

10. The graphics processing chip of claim 1,
wherein the machine-learning model is stored in the programmable memory component and is configured to generate an output based on view data, lighting data, color data, and a second material property data; and wherein the image data stored in the output memory is generated using the output of the machine-learning model.

11. The graphics processing chip of claim 10,
wherein the output of the machine-learning model comprises a color of the fragment.

12. The graphics processing chip of claim 10,
wherein the output of the machine-learning model comprises intensity data; and wherein the image data is generated based on the color data and the intensity data.

13. The graphics processing chip of claim 12,
wherein the machine-learning model is further configured to generate the output based on a second intensity data.

14. The graphics processing chip of claim 13,
wherein the at least one programmable memory component is configured to store a second machine-learning model configured to generate a second output based on one or more of: the view data, the lighting data, the color data, and the second material property data; and wherein the second intensity data is generated using the second output, the view data, and the lighting data.

15. The graphics processing chip of claim 14,
wherein the second intensity data is generated in accordance with an illumination model.

16. The graphics processing chip of claim 15,
wherein the second output of the second machine-learning model comprises specular data used by the illumination model to generate the second intensity data.

17. The graphics processing chip of claim 14,
wherein the machine-learning model and the second machine-learning model are trained end-to-end using a plurality of training samples.

18. The graphics processing chip of claim 10,
wherein the view data, the lighting data, the color data, and the second material property data are associated with one or more fragments.

19. The graphics processing chip of claim 18,
wherein the one or more fragments are generated using the geometry-processing operations and the rasterization operations.

20. The graphics processing chip of claim 18,
wherein the color data and the second material property data are associated with one or more virtual surfaces that have been determined to be visible through the one or more fragments.

* * * * *